2,904,422
Patented Sept. 15, 1959

2,904,422
METHOD OF ERADICATING WEEDS

Joseph M. F. Leaper, Lansdale, John Russell Bishop, Hatfield, and Wood Powell Anderson, Conshohocken, Pa., assignors to Amchem Products, Inc., Ambler, Pa., a corporation of Delaware No Drawing. Application October 7, 1955
Serial No. 539,256

6 Claims. (Cl. 71—2.3)

This invention relates to the control of undesired vegetation and is particularly directed to a method of eradicating weeds when applied pre- and post-emergence.

The invention is based on the discovery that certain carbonates of herbicidal alcohols are highly selective in that they will effectively eradicate various weeds without inflicting any significant damage to valuable crops. The particular carbonates are characterized by the following formula:

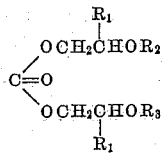

wherein $R_1$ is hydrogen, methyl or ethyl, and $R_2$ and $R_3$ are phenyl, cresyl, xylyl or naphthyl with or without chloro and bromo substitutents.

The group —$OCH_2CHR_1OR_2$ may be called a herbicidal alcohol radical since it is derivable from herbicidal alcohols such as 2,4-dichlorophenoxyethanol; 2,4-dichlorophenoxyisopropanol; 4-chlorophenoxyethanol; 2-methyl, 4-chlorophenoxybutanol; 2-naphthoxyethanol, etc. The herbicidal alcohols may be prepared from their corresponding acids by reduction or by the condensation of the appropriate phenol with ethylene or alkyl substituted halohydrins.

In general, the compounds of the present invention are white crystalline solids having comparatively low melting points and are relatively insoluble in water, very soluble in acetone, benzene and xylene and moderately soluble in carbon tetrachloride and trichloroethylene. Typical examples of said compounds are:

(1) Bis 2,4 dichlorophenoxy ethyl carbonate.
(2) Bis 2,4,5 trichlorophenoxy ethyl carbonate.
(3) Bis 4-chlorophenoxy ethyl carbonate.
(4) Bis 3,4 dichlorophenoxy ethyl carbonate.
(5) Bis 2-methyl, 4-chlorophenoxy ethyl carbonate.
(6) Bis 2-naphthoxy ethyl carbonate.
(7) Bis 2-methyl 4,5 dichlorophenoxy ethyl carbonate.
(8) Bis 2-methyl 3-chlorophenoxy ethyl carbonate.
(9) Bis 2-methyl 4-bromophenoxy ethyl carbonate.
(10) 2,4 dichlorophenoxy ethyl-2-methyl, 4-chlorophenoxy ethyl carbonate.
(11) 2,4 dichlorophenoxy ethyl-2,4,5 trichlorophenoxy ethyl carbonate.
(12) 2,4 dichlorophenoxy ethyl-3,4 dichlorophenoxy ethyl carbonate.
(13) 2,4,5 trichlorophenoxy ethyl-2-methyl, 4-chlorophenoxy ethyl carbonate.
(14) 4-chlorophenoxy ethyl-2-methyl, 4-chlorophenoxy ethyl carbonate.
(15) 2-naphthoxy ethyl-2,4 dichlorophenoxy ethyl carbonate.
(16) Bis 2,4 dichlorophenoxy propyl carbonate.

Compounds of the present invention may be produced in several different ways. For instance, by reacting one molecule of a herbicidal alcohol with one molecule of phosgene, the chloroformate is produced. The chloroformate is in turn reacted with a molecule of the same or different herbicidal alcohol, thus producing either the symmetrical or unsymmetrical carbonate.

In operating in accordance with the invention, the toxic compound is distributed by any suitable means in or on soil or other growth medium infested with the seeds of undesired vegetation or on the undesired vegetation itself and surrounding soil.

Inasmuch as the compounds are water-insoluble the practical method of application is by dusting or spraying formulations containing mixtures of the active ingredient with a finely divided inert solid diluent such as talc, pyrophyllite, gypsum, diatomaceous earth, volcanic ash, attaclay and the like. Combinations of the carbonates with fertilizers or other soil conditioners may also be used. Dusting formulations may also include a suitable wetting, sticking or emulsifying agent.

If desired, the carbonate may be formulated with an emulsifying agent and with or without a carrier to prepare an emulsifiable liquid concentrate which may further be diluted with oil or dispersed in water. The emulsifying agent is preferably oil soluble such as the condensation products of alkylene oxides with phenols and organic acids, polyoxyethylene derivatives of sorbitan esters, mahogany soaps from the sulfonation of petroleum and the like. The organic carriers which may be utilized include aromatic hydrocarbons, halohydrocarbons, solvents derived from distillation of petroleum and coal, and the like. In addition to the active ingredient, the oil or carrier and the emulsifier, the concentrate may also include a co-solvent for the active ingredient and oil.

The proportions of the materials employed in the compositions may vary considerably. Dust compositions and liquid dispersions for direct application to vegetation may contain from 0.2 to 15 percent by weight of the carbonate whereas concentrates for subsequent dilution as a spray or dust may contain 10 to 50 percent by weight of the carbonate.

The amount of carbonate to be applied varies primarily with the nature of the valuable crops, the species of weeds to be eradicated and the stage of their growth. In general, from about 1 to 16 pounds of the carbonate is applied per acre, although selective control of crabgrass and such broadleaf plants as red clover, pigweed, black mustard may be effected with as little as ½ pound per acre.

The following are illustrative but non-limitative examples of the invention:

Example 1

Plots were seeded with representative broadleaf plants (snapbean, soybean, cotton, sugar beet, red clover, pigweed and black mustard) and with representative grass plants (corn, sorghum, wheat, oats, giant foxtail, ryegrass, bluegrass and crabgrass).

Solutions up to 1.0 percent of bis-(2,4-dichlorophenoxy ethyl) carbonate in acetone were sprayed through an atomizer with a pressure of 8 to 10 p. s. i. on the soil surface the day following the seeding in the pre-emergence treatment and five to ten days after seeding depending upon the development of the plants in the post-emergence treatment. The solutions were applied in amounts equivalent to 1 to 16 lbs. per acre. Observations were made 3 to 4 weeks after the pre-emergence treatment and 2 to 3 weeks after the post-emergence treatment.

It was noted that at 1 lb./acre, pre-emergence application, there was little or no effect on the valuable crops, whereas the destructive effect on crabgrass and pigweed was marked and on black mustard moderate. At 4 lbs./acre the same general observations were noted except that pigweed and black mustard were dead. Even at 16 lbs./ acre while the destruction of the undesirable plants and some valuable crops was extensive, there was no effect on wheat and little on corn. In the post-emergence application at 8 lbs./acre, with the exception of cotton, none of the valuable crops were affected whereas the effect on red clover was marked and on crabgrass moderate.

*Example 2*

The same procedure as Example 1 was followed with solutions in acetone up to 1.0 percent of bis-(2,4,5-trichlorophenoxy ethyl) carbonate.

It was noted that in the pre-emergence application at 1 lb./acre there was no effect on the valuable crops whereas the destructive effect on crabgrass was marked and on giant foxtail moderate. At 4 lbs./acre there was no effect on wheat and cotton, only slight effect on corn, sorghum and snapbean, a marked effect on soybean and complete destruction of sugar beet. Crabgrass, pigweed and black mustard were dead and red clover markedly affected. Even at 16 lbs./acre, there was no effect on wheat and only slight effect on sorghum and cotton whereas the undesirable plants were all dead with the exception of ryegrass.

*Example 3*

The same procedure was followed as in Example 1 with solutions in acetone up to 1.0 percent of bis-(2-methyl, 4-chlorophenoxy ethyl) carbonate.

In a pre-emergence application at ½ lb./acre it was noted that there was no effect on the valuable crops, except sugar beet, but marked destruction of crabgrass and red clover and complete destruction of pigweed and black mustard. At 1 lb./acre the same general effect was noted. At 2 lbs./acre there was no effect on wheat and oats, only slight on corn, sorghum and snapbean, moderate on soybean and cotton and complete destruction of sugar beet. However, crabgrass, pigweed and black mustard were dead, and giant foxtail, ryegrass and red clover markedly affected. At 4 lbs./acre there was no effect on wheat, slight on corn, moderate on sorghum and snapbean, marked on soybean and complete destruction of sugar beet. Giant foxtail, crabgrass, red clover, pigweed and black mustard were all dead and ryegrass markedly affected. At 8 lbs./acre the effect on corn, wheat and snapbean was only slight whereas sorghum, soybean, cotton and sugar beet were dead. Also dead were giant foxtail, crabgrass, red clover, pigweed and black mustard while ryegrass was markedly affected. At 16 lbs./acre there was only a slight effect on wheat and oats, moderate on corn and marked on sorghum, snapbean, soybean and cotton; but foxtail, bluegrass, red clover and pigweed were dead and ryegrass and crabgrass markedly affected.

*Example 4*

The same procedure was followed as in Example 1 with acetone solutions up to 1.0 percent of 2-methyl, 4-chlorophenoxy ethyl-2,4-dichlorophenoxy ethyl carbonate.

At 1 lb./acre, pre-emergence application, it was noted that there was no effect on sorghum, wheat, soybean and cotton, only slight on corn and snapbean and marked on sugar beet. Crabgrass, pigweed and black mustard were markedly affected. At 4 lbs./acre there was no effect on wheat and sugar beet, slight on corn, sorghum and cotton, moderate on soybean and marked on snapbean. Crabgrass, pigweed and black mustard were dead and red clover markedly affected.

*Example 5*

The same procedure of Example 1 was followed with acetone solutions up to 1.0 percent of 2-methyl, 4-chlorophenoxy ethyl-2,4,5-trichlorophenoxy ethyl carbonate.

At 1 lb./acre, pre-emergence application, it was noted that there was no effect on wheat and cotton, only a slight effect on corn, sorghum, snapbean and soybean, and a marked effect on sugar beet. Crabgrass was dead, pigweed and black mustard markedly affected and foxtail and red clover moderately affected. At 4 lbs./acre, wheat was not affected, corn only slightly, sorghum moderately, snapbean, soybean and cotton markedly and sugar beet was dead. However, foxtail, crabgrass, pigweed and black mustard were dead and red clover markedly affected.

*Example 6*

The same procedure as Example 1 was followed with acetone solutions up to 1.0 percent of 2,4-dichlorophenoxy ethyl-pentachlorophenyl carbonate.

At 1 lb./acre, pre-emergence application, there was no effect on the valuable crops and moderate effect on crabgrass and pigweed. At 4 lbs./acre, there was at most a slight effect on the valuable crops whereas the effect on crabgrass and pigweed was marked. In the post-emergence application of 4 lbs./acre the pigweed was dead. At 8 lbs./acre, pre-emergence application, the effect on the valuable crops was at most moderate whereas the destructive effect on crabgrass and pigweed was marked. At 16 lbs./acre, post-emergence application, wheat was unaffected, corn slightly, sorghum, soybean and sugar beet moderately and snapbean and cotton markedly. However, pigwood was completely destroyed.

While the above examples show the application of the present organic carbonates as acetone solution sprays, it will be understood that other formulations as disclosed hereinbefore may be used. In fact, practical field applications are generally made with dusting compounds constituting a simple admixture of as little as 0.25 to 0.50 percent of the carbonate and the remainder a finely divided solid inert diluent, such as talc, diatomaceous earth, attapulgite type clay or other solid diluents known in this art.

We claim:

1. A process of eradicating weeds which comprises applying to a field containing such weeds a herbicidally effective amount of an organic carbonate having the structural formula:

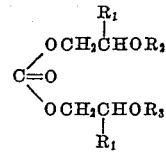

wherein $R_1$ is a member selected from the group consisting of hydrogen, methyl radical and ethyl radical, and wherein $R_2$ and $R_3$ are radicals selected from the group consisting of substituted and unsubstituted phenyl, cresyl, xylyl and naphthyl radicals, the substituents in the substituted radicals being members of the group consisting of chlorine and bromine.

2. The process of claim 1 wherein the carbonate is bis-(2,4-dichlorophenoxy ethyl) carbonate.

3. The process of claim 1 wherein the carbonate is bis-(2-methyl, 4-chlorophenoxy ethyl) carbonate.

4. The process of claim 1 wherein the carbonate is bis-(2,4,5-trichlorophenoxy ethyl) carbonate.

5. The process of claim 1 wherein the carbonate is 2-methyl, 4-chlorophenoxy ethyl-2,4-dichlorophenoxy ethyl carbonate.

6. The process of claim 1 wherein the carbonate is 2-methyl, 4-chlorophenoxy ethyl-2,4,5-trichlorophenoxy ethyl carbonate.

References Cited in the file of this patent

UNITED STATES PATENTS

| | | |
|---|---|---|
| 2,543,397 | Allen | Feb. 27, 1951 |
| 2,573,769 | Lambrech | Nov. 6, 1951 |
| 2,603,560 | Stewart | July 15, 1952 |
| 2,765,224 | Lambrech | Oct. 2, 1956 |
| 2,774,788 | Hlynsky et al. | Dec. 18, 1956 |

OTHER REFERENCES

Proc. North East Weed Control Conf., Jan. 7–9, 1953, page 81.